May 29, 1934.

K. KLUGE ET AL

Re. 19,186

PERPETUAL DATE INDICATOR

Original Filed Feb. 19, 1926 3 Sheets-Sheet 1

INVENTORS
KURT KLUGE
WALTER BERTHOLD

BY Charles S. Wilson
ATTORNEY

May 29, 1934. K. KLUGE ET AL Re. 19,186

PERPETUAL DATE INDICATOR

Original Filed Feb. 19, 1926 3 Sheets-Sheet 2

INVENTORS
KURT KLUGE
WALTER BERTHOLD
BY Charles S. Gibson
ATTORNEY

May 29, 1934. K. KLUGE ET AL Re. 19,186

PERPETUAL DATE INDICATOR

Original Filed Feb. 19, 1926 3 Sheets-Sheet 3

INVENTORS
KURT KLUGE
WALTER BERTHLD
BY Charles S. Wilson
ATTORNEY

Reissued May 29, 1934 Re. 19,186

UNITED STATES PATENT OFFICE 19,186

PERPETUAL DATE INDICATOR

Kurt Kluge and Walter Berthold, Berlin, Germany, assignors to Edward Katzinger, Chicago, Ill.

Original No. 1,755,696, dated April 22, 1930, Serial No. 89,481, February 19, 1926. Application for reissue April 22, 1932, Serial No. 606,982. In Germany February 19, 1925

11 Claims. (Cl. 40—112)

This invention relates to a perpetual date indicator comprising rotatable disks on which the year, months, weeks and days are marked. This invention has for its object to improve the construction of the perpetual date indicator in such a manner that by one feeding movement per day all the necessary adjustings of the disks are effected absolutely automatically. This object is attained essentially by providing on the several disks teeth which stand in predetermined relation the one with regard to the others and act, through the intermediary of feeding springs or pawls, upon one another in such a manner that by one ratchet pawl movement per day all the disks control mutually their positions in such a manner that the correct date is always indicated behind a window, the length of the month and the leap years being taken into consideration. The disks may either have inner or outer teeth or they may have each a separate feed wheel and the perpetual date indicator can be easily coupled with a clock to be automatically adjusted every day from said clock.

An embodiment of the invention is shown, by way of example, in the accompanying drawings in which:—

Figure 3:
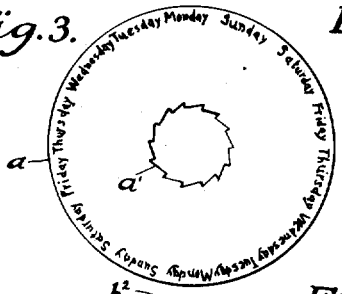
Figs. 3, 4, 5, 6 and 7 show each one of the several disks in plan view.
Figure 4:
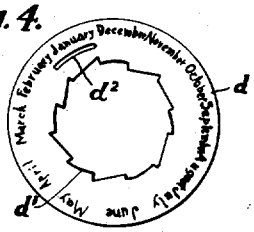
Figure 5:
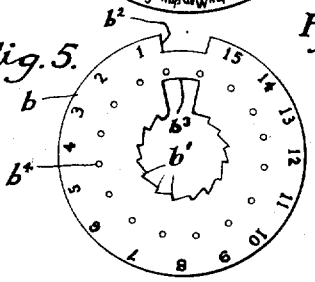
Figure 6:
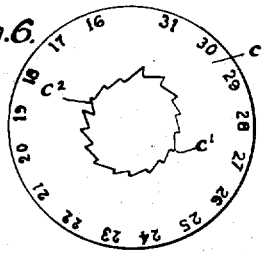
Figure 8:
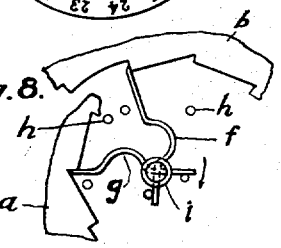
Fig. 8 shows, in larger scale, a separate view of the ratchet pawls or feed springs and the position of the same with regard to the disks.
Figure 9:
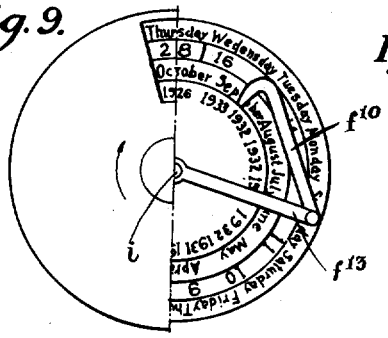
Fig. 9 is a view similar to Fig. 1, the disks having, however, outer teeth.
Figure 10:
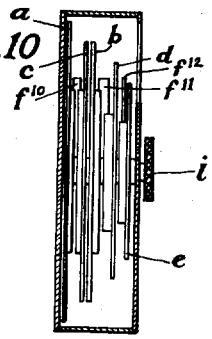
Fig. 10 is a side elevation of Fig. 9.
Figure 11:
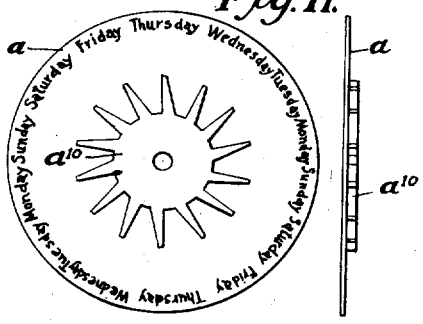
Figs. 11, 12, 13, 14 and 15 show each one of the disks driven by outer teeth.
Figure 12:
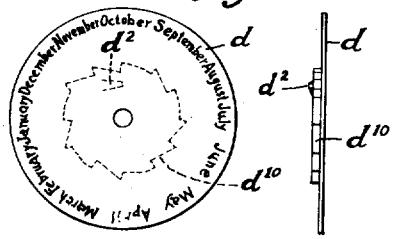
Figure 13:
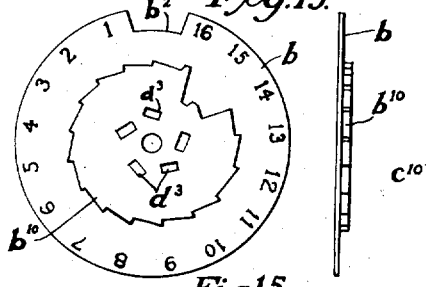
Figure 14:
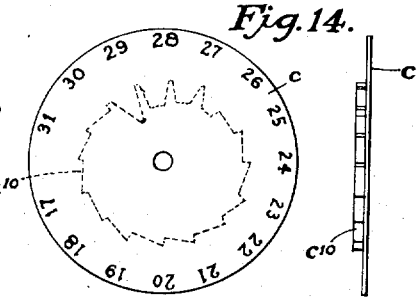

On the weekdays disk $a$ (Fig. 3) the days of the week from Monday to Sunday are marked twice in succession. The disk has consequently 14 teeth $a'$ with which the spring-controlled ratchet pawl $g$ (Fig. 8) engages so that, at the part rotation of shaft $i$ which takes place once every day and at the movement of the ratchet pawls $f$, $g$ due to this part rotation and between the stop pins $h$, a new week day appears every day in the window $k$ of the casing.

In front of the weekday disk $a$ a disk $c$ for the second half of the days of a month (16 to 31) is arranged which has teeth $c'$ standing at different distances from the centre of the disk so that they are situated on an irregular curve. Three special teeth $c^2$ serve for a special purpose which will be hereinafter explained. In front of disk $c$ a disk $b$ is arranged on which the first half of the days of a month are marked, said disk having inner teeth $b'$ and an aperture $b^3$ underneath a notch $b^2$ in its rim. Only, if this notch $b^2$ registers with the window $k$ can the corresponding figure on disk $c$ be read as at any other position of disk $b$ the disk $c$ is covered by it.

The stepwise feeding of disk $b$ taking place once every day by means of a feed spring $f$, the days 1 to 15 are successively brought behind the window and at the sixteenth part rotation the notch $b^2$ registers with the window so that the "16" marked on disk $c$ becomes visible. The feed spring $f$ has the tendency to expand in radial direction, this being, however, possible only when the aperture $b^3$ and the notch $b^2$ are along the radius of the window. After the feed spring $f$ has entered into aperture $b^3$ it no longer engages with the teeth $b'$ of disk $b$ but with the teeth $c'$ of disk $c$ as these teeth are farther distant from the centre of the disk than the teeth $b'$.

Figure 2:
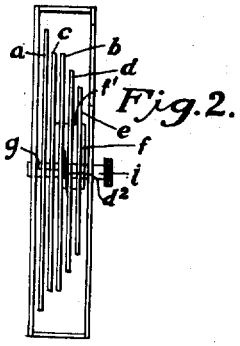
Fig. 2 is a side elevation of Fig. 1.

The feed spring $f$ has an arm $f'$ bent at an angle (Fig. 2) and this arm passes through the disks $e$, $d$, $b$, $c$ so that it may advance one disk singly or several disks at the same time.

When the disk $c$ has rotated up to the end of the month, the teeth $c^2$, which are at a smaller radius than the teeth $c'$, move the pawl $f$ radially inwardly, thereby freeing the disk $b$ and enabling the pawl $f$ to engage the teeth $b'$ again, while the teeth $c^2$ being at the same radius as the teeth of disk $a$, the pawl $g$ then rotates not only the disk $a$ in steps but also the disk $c$ behind disk $b$. Consequently, at the end of the month, disk $b$ is again advanced by the pawl $f$, while the blank space on disk $c$ is brought behind the window $k$ under cover of disk $b$ by pawl $g$.

The month disk $d$ has a catch spring or detent $d^2$ attached thereto and which may be struck from the body of said disk. The catch spring extends forwardly of the disk $d$ and yieldingly engages the disk $b$, the free end of the catch, which may have a knob or depression thereon, enters the holes or cavities $b^4$ in disk $b$. By this construction, each time a new month is adjusted by the action of the teeth $d'$, the catch $d^2$ will draw the disk $b$ along one step.

Figure 7:
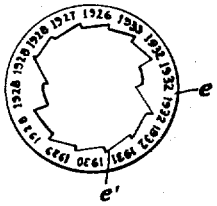

The year-disk $e$, which in the form of construction shown in Fig. 7 is designed for 8 years but may be arranged for any other number of years, has marked on it, in the present case, the leap-years 1928 and 1932 four times in succession and it comprises for this leap year—adjusting special teeth, the object of which will be hereinafter explained.

Figure 1:
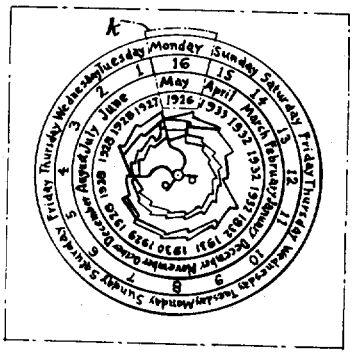
Fig. 1 is a diagrammatical front elevation of the date indicator showing the position of the several disks arranged the one behind the other.
Figure 15:
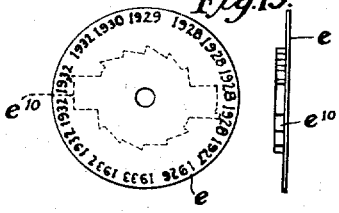
Figure 15:
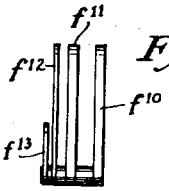
Figure 16:
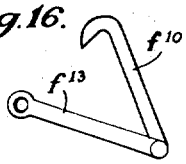
Fig. 16 is an end view and side elevation of the ratchet pawl for the outer teeth.

Supposing the date indicator shows, as in the drawings, Monday, the 16th of May 1926, the "16" on disk $c$ stands then opposite the aperture in the disk $b$ which stands in front of disk $c$, and which is of the same diameter as this disk $c$, while the figures 1 and 15 of disk $b$ are covered by the cover plate in which the window $k$ is arranged. The aperture in the disk $b$ is in vertical position and the feed spring $f$, which during the stepwise-rotation of the figure disk $b$ engages with the feed teeth of said disk, is engaged with the aperture $b^3$ and expanded in radial direction so that it can no longer engage with the teeth of disk $b$ but engages with the teeth of disk $c$. The feed teeth of disk $c$ are, as can be seen from the drawings, irregularly arranged, different from those of disk $b$. The feed spring $f$ is moved once every day between the stop pins and adjusts thereby the disk $c$ from 16 to 17 and so forth. At each feeding movement the disk $a$ for the week-days is also rotated one step by means of the pawl $g$ so that at one feeding movement Tuesday appears instead of Monday and the 17th underneath Tuesday, so that the date of the day is indicated as Tuesday, the 17th of May 1926.

After this has continued up to the 28th of May the pawl expands further in radial direction, as the teeth for the 29th, 30th and 31st of disk $c$ are more and more distant from the centre of the disk, with the result that the feed spring $f$, the bent arm of which engages through the disks $e$, $d$, $b$ and $c$, grips on the 31st not only the one tooth of disk c but at the same time the corresponding tooth of disk $d$ and consequently makes the month-disk $d$ rotate by one step, so that instead of May, June appears behind the window. Instead of the "31" the free space of disk $c$ will come behind the window. The disk $d$ has however, by its rotation, rotated the disk $b$, through the intermediary of the catch spring, through one step so that the "1" comes behind the window and the indicator indicates the 1st of June, above which the corresponding day of week is marked.

The teeth of the disk $c$ between the 31st and 16th are of such shape that the horizontal arm of the feed spring or pawl $f$ is compressed in radial direction, e. g. towards the centre of the disk, so that the feed spring engages with the first tooth at the left side of the aperture in disk $b$, so that at the next following day-feeding the disk $c$ is no longer rotated stepwise but the disk $b$ from the 1st to the 15th of June. Upon rotation from the 15th to the 16th of June the pawl $f$ engages a tooth of disk $b$ and of disk $c$ so that the 16 on disk $c$ is moved into position behind the window and the aperture of disk $b$ is again brought behind the window $k$ so that the feed spring $f$ expands again in a radial direction and the further feeding which has already been described, within the aperture of disk $b$ takes place again with the result that no longer disk $b$, but from the 16th of the month, disk $c$ is rotated in steps and, as the month is June, the feed spring $f$ after the 30th, in addition to rotating the disk $c$ so that "31" comes in line with window $k$, will also rotate the month disk $d$ by one step as hereinbefore described, so that instead of June, July appears behind the window, and owing to the operation of the catch spring of the month disk $d$, the disk $b$ is rotated so that the "1" appears again behind the window.

Upon the next operation of the shaft, the pawl $g$ which normally only actuates disk $a$, engages with one of the teeth $c^2$ of disk $c$, already described, so that the blank space comes in line with the window $k$, though obscured by disk $b$ and disk $c$ is then in its normal inoperative position. After the 15th of the month, disk $c$ is actuated by the pawl $f$ as described above so that the "16" appears behind the window, and the aperture of disk $b$.

The month of February has normally 28 days but in a leap-year 29 days. If there is no leap-year the feed spring $f$ is compressed clear of the aperture $f^3$ of disk $b$ on the 28th, as the tooth for February in the month-disk $d$ is closer to the centre of the disk than the others, so that on the 28th of February it simultaneously rotates by one step the disk $c$ and the month disk $d$, as on the 30th or 31st of other months. After the 28th of February, March appears, therefore, behind the window and the "1" on disk $b$ is brought, as is the case at every change of month, behind this window. The disk $c$ is also moved so that the "29" is in line with window $k$, though obscured by disk $b$. Upon the three following operations of the shaft, the pawl $g$ engages with one of the special teeth $c^2$ of the disk $c$ and moves it in three steps, i. e. from "29" to "30", "30" to "31", and "31" to the blank space which is then behind the window $k$ but obscured by disk $b$.

In the leap-year, 1928 or 1932, care is taken, by the corresponding adjustment of the teeth on the year disk $e$, that the disk $c$ brings the 29th behind the window and that only upon transition from the 29th of February to the next following day are the year-disk $e$ and the month disk $d$ simultaneously rotated. The disks $c$ and $b$ are, on this occasion, drawn along one step by the catch spring of corresponding length so that the 1st of March, 1928, will be indicated. It is necessary that in a leap-year the year-disk $e$ be drawn along several times as the feed spring $f$ is controlled in the first instance from this disk. As can be seen from the drawings the feeding is arranged four times in succession so that the year-disk rotates four steps without change of the number of the year. This is important as at each adjustment the length of the feed spring $f$ must be altered in order to insure the correct part rotation of the disks $c$ and $d$.

On the 31st of December 1927 the number of the new year is adjusted. On the 31st of January 1928 the disk $e$ is rotated by the length of one tooth. The new tooth of the year 1928 covers the tooth of disk $d$ which would otherwise be operative (February position). On the 28th of February there will consequently be no adjustment to the 1st of March. After the 28th of February only the disk $a$ for the days of the week will be advanced by one step, and the disk $c$ will be rotated to the 29th, the year-disk $e$ being at the same time rotated by one step. The new tooth of the year-disk which enters thus into operation then releases the tooth of the month-disk $d$ which had been covered. After the 29th of February, the 1st of March will therefore be indicated.

In the form of construction shown in Figs. 9 to 16, the arrangement of the disks $a$ to $e$ is generally the same as in the form of construction which has been described above with the exception that the driving is effected by outer teeth and not by inner teeth. With this object in view, tooth-wheels $a^{10}$, $b^{10}$, $c^{10}$, $d^{10}$ and $e^{10}$ are rigid with said disks. The feed pawls $f^{10}$, $f^{11}$, $f^{12}$ (Fig. 16) are mounted on hinges $f^{13}$ controlled by springs $f^{14}$ and adapted to oscillate around an axle $i$.

As above pointed out, that form of the invention shown in Figs. 9 to 16 inclusive operates in all particulars like the form of the invention illustrated in Figs. 1 to 8 inclusive, except that the operating teeth are on wheels $a^{10}$, $b^{10}$, $c^{10}$, $d^{10}$, and $e^{10}$ positioned at the sides of their respective disks $a$, $b$, $c$, $d$ and $e$. The teeth are so formed that they occupy the same positions relative to each other and relative to their respective disks as do the internal teeth of the disks shown in Figs. 1 to 8 inclusive.

The pawls $f^{10}$, $f^{11}$, and $f^{12}$ cooperate with the teeth of the wheels $a^{10}$, $b^{10}$, $c^{10}$, $d^{10}$ and $e^{10}$ to advance them and their respective disks and are held in operative relation to the teeth by the springs $f^{14}$ interposed between the pawls and the hinges $f^{13}$. The hinges $f^{13}$ oscillate upon or with the shaft or axle $i$ and as the pawls are pivoted thereto they are free to ride over and engage the teeth aforesaid. In other words, the pawls are pivoted to the members $f^{13}$ for independent movement relative to each other and are drawn toward the members $f^{13}$ by the springs $f^{14}$.

The pawl $f^{10}$ is positioned between the disks $a$ and $c$ and cooperates with the teeth of the wheels $a^{10}$ and $c^{10}$ and upon each movement thereof advances these disks one step. The pawl $f^{11}$ is located between the disks $b$ and $d$ to coact with the teeth on wheels $b^{10}$ and $d^{10}$; while the pawl $f^{12}$ cooperates with the teeth of the wheel $e^{10}$. Though all of the pawls $f^{10}$, $f^{11}$ and $f^{12}$ are moved once daily the depth and arrangement of the teeth on the wheels $a^{10}$, $b^{10}$, $c^{10}$, $d^{10}$ and $e^{10}$ are such that the disks are moved relatively in the same manner and proportions as are the disks $a$, $b$, $c$, $d$ and $e$ in that form of the invention shown in Figs. 1 to 8 inclusive, all of which is fully described above.

The catch spring $d^2$ engages with indentations $d^3$ of the toothed wheel $b^{10}$, only five indentations being provided as, in the case of the month having 31 days, the advancing of disk $b$ is effected directly by the feed spring.

Figure 17:
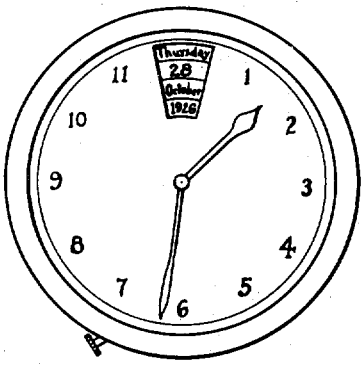
Fig. 17 shows, in front elevation, a clock with the date indicator.
Figure 18:
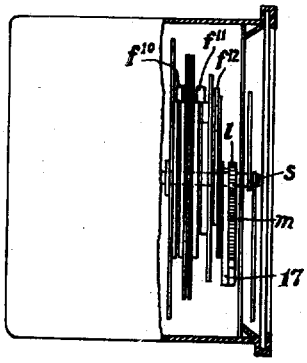
Fig. 18 is a side elevation of Fig. 17.
Figure 19:
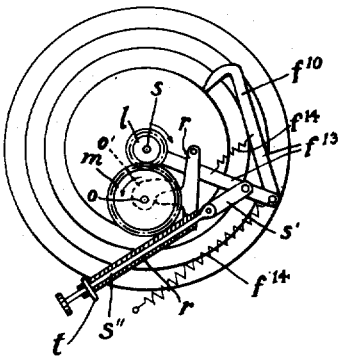
Fig. 19 shows, in front elevation, how the ratchet pawl is driven by the clockwork.
Figure 20:
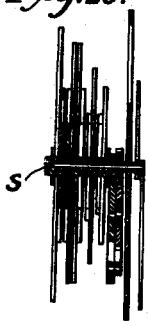
Fig. 20 is a section through the shaft of the hour hand.
Figure 8A:
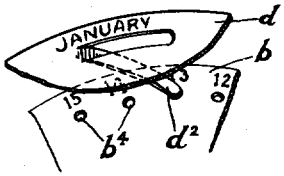
Fig. 8a is a view showing the resilient connection between the month disk and one of the numeral disks.

Figs. 17 to 19 show the manner in which the date indicator may be connected with a clock. The shaft $s$ of the hour hand drives, through the intermediary of a toothed wheel $l$, a toothed wheel $m$ twice the size of the latter wheel, and on the axle $o$ of toothed wheel $m$ a tappet cam $o'$ is keyed. This tappet cam $o'$ rotates once around its axis in 24 hours and makes the hinge $r$ oscillate. A rod $s''$ extends through the hinge $r$ and, by means of the hinge $s'$, operates the hinge $f^{13}$ and, consequently, the pawls $f^{10}$, $f^{11}$, $f^{12}$ (Fig. 16), thereby effecting, by said pawls an advancement each day.

Should the clock stop, the rod $s''$ can be released by removing a coupling pin $t$ and rod $s''$ can thus be operated by hand, so that the date indicator is controlled independently of the clock.

We claim:—

1. A perpetual date indicator calendar comprising a casing having a window therein, a disk marked with the names of the days, a plurality of superposed figure disks of equal diameter different from that of the day disk and numbered with the dates of the consecutive sections of the month, a month indicating disk next to and different in diameter from the day and figure disks, teeth on said disks, and pawl means adapted to be actuated once a day to act on said teeth, said teeth being so disposed that they cause adjustment of the disks correctly each day, allowing for the length of the month and for the leap year.

2. A perpetual date indicator in accordance with claim 1, wherein the front figure disk is numbered from 1 to 15 and has a notch in its periphery between the 1 and the 15 to expose the figure on the rear figure disk, said front disk also having an aperture in the toothed portion to effect release of said front disk from said pawl means, and a year disk of different diameter arranged next to the month disk and provided with teeth whereby said disk is adjustable when required.

3. A perpetual date indicator in accordance with claim 1, wherein the front figure disk is numbered from 1 to 15 and has a notch in its periphery between the 1 and the 15 to expose the figures on the rear figure disk, said front disk also having an aperture in the toothed portion radially disposed beneath said notch, and a year disk of different diameter arranged next to the month disk and provided with teeth whereby said disk is adjustable when required, the pawl means operating said front disk being expansible, and wherein said aperture extends to the teeth of said front disk to form a gap in said teeth whereby said pawl means acts first upon the teeth on the front disk until the notch registers with the window, whereupon said pawl means enters said aperture and the figures on the rear disk become visible through the notch and window, and the said pawl means expanding radially into said aperture comes into operative relation with the teeth of the rear disk.

4. A perpetual date indicator in accordance with claim 1, wherein the front figure disk is numbered with 1 to 15 and has a notch in its periphery between the 1 and the 15 to expose the figures on the rear figure disk, said front disk also having an aperture in the toothed portion to effect release of said front disk from said pawl means, a year disk of different diameter arranged adjacent to the month disk and provided with teeth whereby said disk is adjustable when required, and wherein said front figure disk is provided with cavities arranged concentrically to said operating shaft, and a catch spring arranged on the month disk and engageable in said cavities and which rotates the front disk each time the month disk is rotated until the figure 1 appears opposite the window.

5. A perpetual date indicator in accordance with claim 1, wherein the days of the week are marked twice around the day disk so that the teeth of said disk are approximately similar to the teeth of the other disks.

6. A perpetual date indicator in accordance with claim 1, wherein the front figure disk is numbered from 1 to 15 and has a notch in its periphery between the 1 and the 15 to expose the figures on the rear figure disk, said front disk also having an aperture in the toothed portion radially disposed beneath said notch to effect release of said front disk from said pawl means, and a year disk of different diameter arranged adjacent to the month disk and provided with teeth whereby said disk is adjustable when required, and wherein the disks are toothed internally and the pawl means consists of two feed springs fixed to said shaft at an angle to one another with one of said springs serving to rotate the day disk and the other being bent at an angle and extending through the year disk, month disk and the figure disks, so that either one, two or more disks can be adjusted by said other spring according to the teeth on the several disks.

7. A perpetual date indicator in accordance with claim 1, wherein the front figure disk is numbered from 1 to 15 and has a notch in its periphery between the 1 and the 15 to expose the figures on the rear figure disk, said front disk also having an aperture in the toothed portion radially disposed beneath said notch to effect release of said front disk from said pawl means, a year disk of different diameter arranged next to the month disk and provided with teeth whereby said disk is adjustable when required, and wherein the disks are toothed internally and the pawl means consists of two feed springs fixed to said shaft at an angle to one another with one of said springs serving to rotate the day disk and the other being bent at an angle and extending through the year disk, month disk and the figure disks, so that either one, two or more disks can be adjusted by said other spring according to the teeth on the several disks, and stops for limiting movement of said feed springs to right and left and causing movement of the disks only through a predetermined angle.

8. A perpetual date indicator in accordance with claim 1, wherein the front figure disk is numbered from 1 to 15 and has a notch in its periphery between the 1 and the 15 to expose the figures on the rear figure disk, said front disk also having an aperture in the toothed portion radially disposed beneath said notch to effect release of said front disk from said pawl means, and a year disk of different diameter arranged next to the month disk and provided with teeth whereby said disk is adjustable when required, and wherein the disks are toothed internally and the pawl means consists of two feed springs fixed to said shaft at an angle to one another with one of said springs serving to rotate the day disk and the other being bent at an angle and extending through the year disk, month disk and the figure disks, so that either one, two or more disks can be adjusted by said other spring according to the teeth on the several disks, and wherein the figure disk for the second half of the month is provided with three special teeth with which one of the two feed springs engages at the end of a month, whereby as the disk for the first half of the month rotates the disk for the second half of the month is so adjusted that after the complete rotation of the first disk the figures on the second disk appear correctly at the window.

9. A perpetual date indicator in accordance with claim 1, wherein the front figure disk is numbered from 1 to 15 and has a notch in its periphery between the 1 and the 15 to expose the figures on the rear figure disk, said front disk also having an aperture in the toothed portion radially disposed beneath said notch to effect release of said front disk from said pawl means, and a year disk of different diameter arranged next to the month disk and provided with teeth whereby said disk is adjustable when required, and wherein said year disk has the leap years marked four times in succession and the teeth therein are so arranged that during leap years the year disk makes a partial rotation on the 29th of February and on three prior occasions commencing with the last day of the previous year.

10. A perpetual date indicator comprising a plurality of superposed disks having central bores therein, certain of the bores being non-circular, said bores being of approximately equal size and provided with teeth along their peripheries, and a single expanding pawl engageable with the teeth of said disks, said teeth being so positioned with respect to the centers of the respective disks that said disks are rotated in step-wise fashion by said pawl in a predetermined sequence.

11. In a device of the character described, the combination with a shaft, of a plurality of disks mounted thereon for variable independent step by step advancement on said shaft, a unitary pawl coacting with all of said disks, and teeth carried by the disks inwardly of the peripheries thereof for coaction with the pawl whereby the pawl may engage and advance certain or all of said disks upon the shaft.

KURT KLUGE.
WALTER BERTHOLD.